US009935825B2

(12) United States Patent
Aswathanarayana et al.

(10) Patent No.: US 9,935,825 B2
(45) Date of Patent: Apr. 3, 2018

(54) SYSTEM AND METHOD FOR PROVISIONING AND DEPLOYMENT OF APPLICATION ENVIRONMENT ON HYBRID CLOUD PLATFORM

(71) Applicant: Wipro Limited, Bangalore (IN)

(72) Inventors: Hemanth Kumar Aswathanarayana, Bangalore (IN); Ahmed Wajid Baig, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 276 days.

(21) Appl. No.: 14/859,851

(22) Filed: Sep. 21, 2015

(65) Prior Publication Data

US 2017/0041189 A1     Feb. 9, 2017

(30) Foreign Application Priority Data

Aug. 3, 2015   (IN) ............................ 4027/CHE/2015

(51) Int. Cl.
| | | |
|---|---|---|
| *G06F 15/173* | (2006.01) | |
| *H04L 12/24* | (2006.01) | |
| *G06F 9/445* | (2018.01) | |
| *G06F 9/455* | (2018.01) | |
| *H04L 29/08* | (2006.01) | |

(52) U.S. Cl.
CPC ............ *H04L 41/0806* (2013.01); *G06F 8/61* (2013.01); *G06F 9/45558* (2013.01);
(Continued)

(58) Field of Classification Search
CPC . H04L 41/0806; H04L 41/0843; H04L 67/34; H04L 67/10; G06F 9/45558; G06F 8/61
See application file for complete search history.

(56) References Cited

U.S. PATENT DOCUMENTS

| | | | | | |
|---|---|---|---|---|---|
| 2004/0205101 | A1* | 10/2004 | Radhakrishnan | ..... | G06F 9/5016 709/200 |
| 2006/0265583 | A1* | 11/2006 | Eilam | ................. | H04L 41/0889 713/100 |

(Continued)

OTHER PUBLICATIONS

Breitenbücher et al.:"Combining declarative and imperative cloud application provisioning based on TOSCA", 2014 IEEE International Conference on Cloud Engineering (Mar. 11, 2014), pp. 87-96.
Guillén et al.:"A service-oriented framework for developing cross-cloud migratable software",, The Journal of Systems and Software, vol. 86, No. 4, ( Jan. 3, 2013), pp. 2294-2308.

(Continued)

*Primary Examiner* — Richard G Keehn
(74) *Attorney, Agent, or Firm* — Finnegan, Henderson, Farabow, Garrett & Dunner, LLP

(57) ABSTRACT

This disclosure relates generally to computer resource management over multiple cloud platforms, and more particularly to a system and method for provisioning of application environment and deployment of application across hybrid cloud platform. In one embodiment, a method is provided for provisioning an application environment across a hybrid cloud platform. The method comprises generating a platform independent provisioning template based on at least one of a resource specification and a configuration data. The platform independent provisioning template is compatible with multiple cloud platforms. The method further comprises generating a plurality of target platform artifacts compatible with a corresponding plurality of target cloud platforms based on at least one of the resource specification and the configuration data, associating the plurality of target platform artifacts with the platform independent provisioning template, and provisioning the application environment across the hybrid cloud platform by executing the platform independent provisioning template on each of the plurality of target cloud platforms.

25 Claims, 5 Drawing Sheets

(52) U.S. Cl.
CPC .......... *H04L 41/0843* (2013.01); *H04L 67/34* (2013.01); *H04L 67/10* (2013.01)

(56) References Cited

U.S. PATENT DOCUMENTS

| | | | |
|---|---|---|---|
| 2007/0083588 A1* | 4/2007 | Keller | H04L 69/40 709/202 |
| 2008/0294777 A1 | 11/2008 | Karve | |
| 2012/0266168 A1* | 10/2012 | Spivak | H04L 67/34 718/1 |
| 2013/0232480 A1 | 9/2013 | Winterfeldt et al. | |
| 2014/0007079 A1 | 1/2014 | Whitney et al. | |
| 2014/0274408 A1* | 9/2014 | Dave | H04L 67/38 463/42 |
| 2015/0180949 A1 | 6/2015 | Maes et al. | |

OTHER PUBLICATIONS

Ferry et al:, "Towards model-driven provisioning, deployment, monitoring, and adaptation of multi-cloud systems", 2013 IEEE Sixth International Conference on Cloud Computing,( 2013) pp. 887-894.

Matt Sampson: Azure Resource Manager Tools Preview. )http://www.facebook.com/share.php?u=https%3A%2F%2Fazure.mocrosoft.com%2Fblog%2Fazure-resource-manager-tools-preview%2F) (http://twitter.com/share?url=https%3A%2F%2Fazure.microsoft.com%2Fblog%2Fazure-resource-mamager-tools-preview%2F&text=Azure+Resource+Manager+Tools+Preview) (http://linkedin.com/shareArticle?mini=true&url=https%3A%2F%2Fazure.microsoft.com%2Fblog%2Fazure-resource-manager-tools-preview%2F) (posted Aug. 11, 2014—pp. 1-14}.

Extended European Search Report in counterpart European application No. 15202588.8 dated Nov. 24, 2016.

CA Technologies, "CA Server Automation," ca.com/server-automation; 2 pages (2012).

"AWS CloudFormation Templates," https://aws.amazon.com/cloudformation/aws-cloudformation-templates/ 4 pages, (2012).

Datasheet, "Power Digital Innovation with a Cloud Management Platform That Delivers Agility While Managing Risk and Cost," BMC Cloud Lifecycle Management, 2 pages, (2016).

\* cited by examiner

SYSTEM AND METHOD FOR PROVISIONING AND DEPLOYMENT OF APPLICATION ENVIRONMENT ON HYBRID CLOUD PLATFORM

TECHNICAL FIELD

This disclosure relates generally to computer resource management over multiple cloud platforms, and more particularly to a system and method for provisioning of application environment and deployment of application across hybrid cloud platform.

BACKGROUND

In the current business environment, the use of cloud computing and cloud services has become ubiquitous for many organizations. Cloud computing employs a network of remote servers hosted on the communication network (e.g., Internet) to store, manage, and process data and to deliver hosted services. These services are broadly divided into three categories: Infrastructure-as-a-Service (IaaS), Platform-as-a-Service (PaaS), and Software-as-a-Service (SaaS). Cloud computing and storage solutions provide users and enterprises with various capabilities to store and process their data in third-party data centers.

It is often desirable to deploy a project with computing resources sourced from various cloud providers and/or data centers as the products and services offered by each cloud provider have their strengths and limitations. However, each cloud provider has a different approach and requires a different set of skills for provisioning (e.g., defining, making ready for use, setting-up, and so forth), using, and managing respective computing resources. For example, most cloud providers support a template driven provisioning capability which use application program interfaces (APIs) defined by the respective cloud provider to trigger the provisioning. However, while APIs are provided for doing the provisioning activity, they are different for each provider. Further, the format of the templates is different across providers. The default template provided by each of the cloud providers are quite diverse in nature and do not follow any suitable standards or convention. One has to create specific template for each of the providers, thereby requiring expertise on that specific environment. This gets further complicated with multiple heterogeneous cloud providers. On one hand the possibility of human error can be quite high on the other hand reusability of template may become a challenge. Similar to the case of the provisioning, deployment and validation across provider is cumbersome with the existing mechanism since the deployment and the validation are specific to a cloud provider and the scripts for one provider will not be compatible for execution on another provider's platform.

The existing mechanism therefore fails to provide (a) integrated provisioning of application environment and deployment of application across hybrid platforms in terms of automation, registration, execution and verification; and (b) reusable and interoperable artefacts (e.g., templates, scripts, and so forth) and processes provisioning of application environment and deployment of application across hybrid platforms. Accordingly, it is difficult and time consuming to provision, use, and manage computing resources across multiple cloud providers and/or data centers.

SUMMARY

In one embodiment, a method for provisioning an application environment across a hybrid cloud platform is disclosed. In one example, the method comprises generating a platform independent provisioning template based on at least one of a resource specification and a configuration data. The platform independent provisioning template is compatible with multiple cloud platforms. The method further comprises generating a plurality of target platform artefacts compatible with a corresponding plurality of target cloud platforms based on at least one of the resource specification and the configuration data. The method further comprises associating the plurality of target platform artefacts with the platform independent provisioning template. The method further comprises provisioning the application environment across the hybrid cloud platform by executing the platform independent provisioning template on each of the plurality of target cloud platforms.

In one embodiment, a system for provisioning an application environment across a hybrid cloud platform is disclosed. In one example, the system comprises at least one processor and a memory communicatively coupled to the at least one processor. The memory stores processor-executable instructions, which, on execution, cause the processor to generate a platform independent provisioning template based on at least one of a resource specification and a configuration data. The platform independent provisioning template is compatible with multiple cloud platforms. The processor-executable instructions, on execution, further cause the processor to generate a plurality of target platform artefacts compatible with a corresponding plurality of target cloud platforms based on at least one of the resource specification and the configuration data. The processor-executable instructions, on execution, further cause the processor to associate the plurality of target platform artefacts with the platform independent provisioning template. The processor executable instructions, on execution, further cause the processor to provision the application environment across the hybrid cloud platform by executing the platform independent provisioning template on each of the plurality of target cloud platforms.

In one embodiment, a non-transitory computer-readable medium storing computer-executable instructions for provisioning an application environment across a hybrid cloud platform is disclosed. In one example, the stored instructions, when executed by a processor, cause the processor to perform operations comprising generating a platform independent provisioning template based on at least one of a resource specification and a configuration data. The platform independent provisioning template is compatible with multiple cloud platforms. The operations further comprise generating a plurality of target platform artefacts compatible with a corresponding plurality of target cloud platforms based on at least one of the resource specification and the configuration data. The operations further comprise associating the plurality of target platform artefacts with the platform independent provisioning template. The operations further comprise provisioning the application environment across the hybrid cloud platform by executing the platform independent provisioning template on each of the plurality of target cloud platforms.

It is to be understood that both the foregoing general description and the following detailed description are exemplary and explanatory only and are not restrictive of the invention, as claimed.

BRIEF DESCRIPTIONS OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
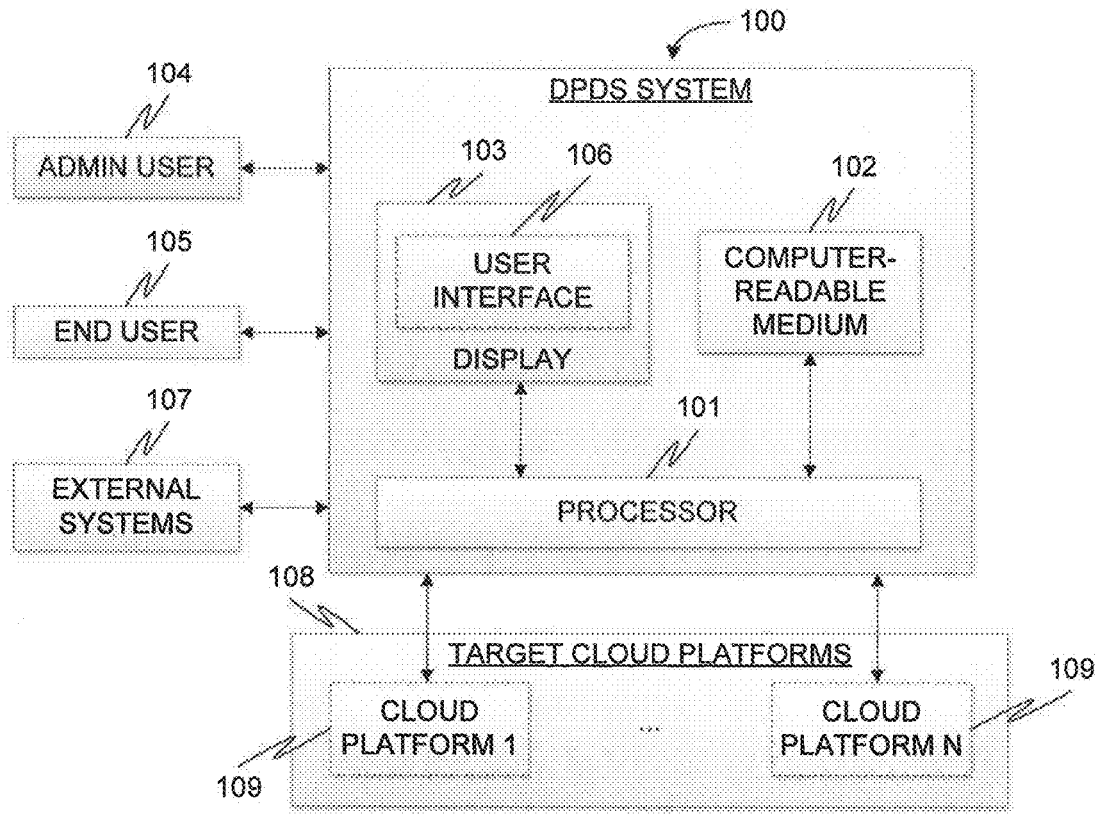
FIG. 1 is a block diagram of an exemplary system for dynamic provisioning of application environment and deployment of application across hybrid cloud platform in accordance with some embodiments of the present disclosure.

Referring now to FIG. 1, an exemplary system 100 for dynamic provisioning of application environment and deployment of application across hybrid cloud platform is illustrated in accordance with some embodiments of the present disclosure. In particular, the system 100 implements a dynamic provisioning and deployment (DPDS) engine to provision application environments and deploy applications on them across hybrid cloud platforms. The system 100 comprises one or more processors 101, a computer-readable medium (e.g., a memory) 102, and a display 103. The computer-readable medium 102 stores instructions that, when executed by the one or more processors 101, cause the one or more processors 101 to perform dynamic provisioning of application environment and deployment of application across hybrid cloud platform in accordance with aspects of the present disclosure. The system 100 interacts with multiple users such as admin users 104 and end users 105 via a user interface 106 accessible to the users via the display 103. The system 100 may be used programmatically from other external systems 107 to perform provisioning and deployment as well. Additionally, the system 100 interfaces with hybrid cloud infrastructures 108 comprising of multiple cloud platforms 109 through a cloud interface to facilitate provisioning of application environment and deployment of the application on the application environment across the hybrid cloud platform.

The multiple cloud platforms may include Amazon Web Services (AWS), BMC's Cloud Lifecycle Manager (CLM), Microsoft Azure, CA Cloud Service, HP Cloud Service, and so forth. Further, the application environment for example may include multiple virtual machines with storages attached. Each virtual machine may have a set of software installed upon which the application gets deployed. The dependencies between these virtual machines are established based on the software installed on them. The topology of such an environment is generally represented as a template so that similar environments can be created using the templates in future.

Figure 2:
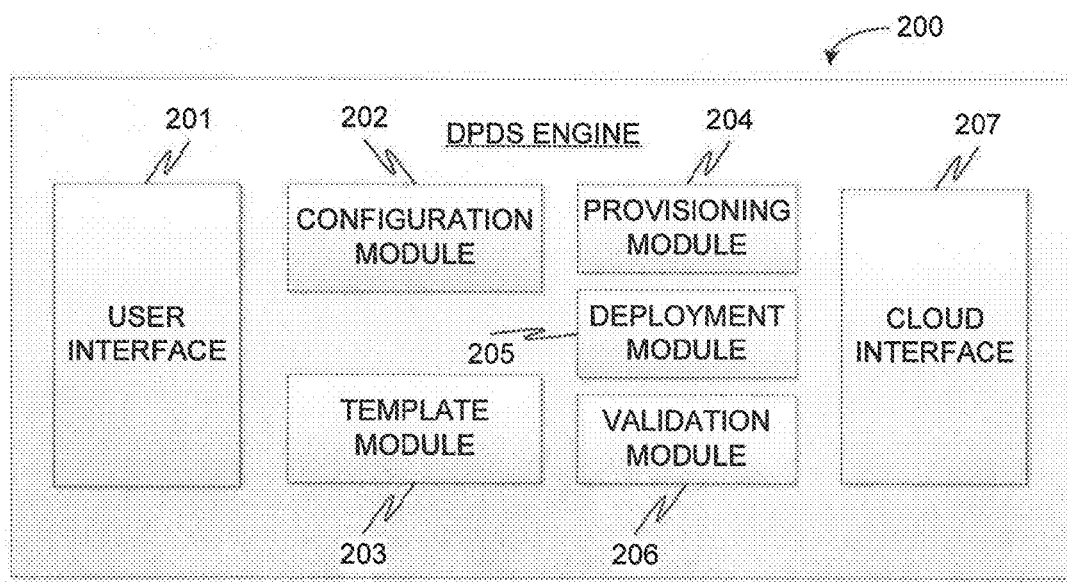
FIG. 2 is a functional block diagram of dynamic provisioning and deployment (DPDS) engine in accordance with some embodiments of the present disclosure.

Referring now to FIG. 2, a functional block diagram of the DPDS engine 200 implemented by the system 100 of FIG. 1 is illustrated in accordance with some embodiments of the present disclosure. As will be described in greater detail below, the DPDS engine 200 prepares for managed deployment of application across hybrid cloud platforms, performs integrated provisioning of application environment and deployment of application across hybrid cloud platforms, and performs verification of integrated deployment across hybrid cloud platforms. In some embodiments, the DPDS engine 200 comprises a user interface 201, a configuration module 202, a template module 203, a provisioning module 204, a deployment module 205, a validation module 206, and a cloud interface 207.

The user interface 201 enables the users to interact with the DPDS engine 200. The user may provide inputs through a graphical interface, a command line interface, or an application program interface. Further, the user interface 201 interacts with the various modules of the DPDS engine including the configuration module 202, the template module 203, the provisioning module 204, the deployment module 205, and the validation module 206.

In some embodiments, the user interface 201 facilitates role based access to the necessary functionalities of the DPDS engine to different users. For example, it facilitates the admin user to define configuration of resource specification (RS) to be employed for creation of platform independent provisioning templates. Similarly, it facilitates the end user to provision application environment and to deploy application across the hybrid cloud platform. The resource specification may include an application specification (AS) and a deployment specification (DS). Application specification includes details about the type of workload to be deployed. Similarly, deployment specification includes details about the target cloud platform. In some embodiments, resource specification may also include information like a computing capacity, a storage capacity, a network requirement, an application executable, an application container, a middleware information, a database information, and so forth. Further, resource specification may also include a workflow specification (WS) which in turn includes process flows for provisioning and deployment.

The configuration module 202 provides the capabilities to store and manage configuration data for the DPDS engine 200. The configuration data may include unified resource specifications (URS), target cloud platform specifications (TCPS), and a resource mapping (RM) i.e., mapping between the URS and the TCPS. The configuration data is persisted within configuration database (CDB). The configuration data is loaded into the memory during execution using indexed data structures that provides fast retrievals. The URS may include resource specification for virtual machines (VM), storage, network, memory, operating systems, middleware software, software versions and so forth. Similarly, TCPS may include user credentials, platform resource specification (PRS), and so forth. As noted above, resource mapping may include mapping between URS and TCPS entities. The configuration module 202 tries to automatically build the resource mapping between the URS and the TCPS. In some embodiments, the configuration module 202 has the ability to verify any discrepancy in the generated resource mapping and seek specific inputs from the admin user through the user interface 201 for resolution of these discrepancies.

The template module 203 provides capability to manage the creation and compilation of the generic templates i.e., the platform independent provisioning template using the resource specification provided by the admin user through the user interface 201. Typically, a template defines the topology of the application landscape including relationships and dependencies among the virtual machines and other resources in the landscape. It also includes sequence of deployment orchestrations. In accordance with aspects of the present disclosure, the platform independent provisioning templates include unified cloud deployment context (UCDC) templates created in an XML format. The UCDC template is based on TOSCA (topology and orchestration specification for cloud application) standard with certain specific extensions. The UCDC template includes a static representation section of the template called UCDC-Service Context (UCDC-SC). The UCDC-SC contains of a topology definition (UCDC-TD) and a workflow definition (UCDC-WD) for the application environment. UCDC-TD represents the topology using constructs like NodeType (NT), RelationshipType (RT) and ArtifactType (AT) as per the TOSCA standard. Similarly, UCDC-WD represents the workflow steps using constructs like ProvisioiningFlow (PF) and DeploymentFlow (DF). PF and DF constructs are the certain of the specific extensions defined in the UCDC. Further, the UCDC template includes representation of the runtime status captured under the UCDC-Execution Context (UCDC-EC) section. UCDC-EC captures the status of execution of every step defined in the UCDC-WD. The UCDC-EC uses constructs like ProvisioningFlowStatus (PFS) and DeploymentFlowStatus (DFS) to represent the status of the execution. It should be noted that UCDC template is designed to be fault tolerant so that the provisioning workflow can be re-started from the nearest suitable point from the point of failure in case the process fails midway while provisioning across hybrid cloud platforms.

The template module 203 creates UCDC-TD using the information in the URS represented within the NT and RT constructs. Further, the template module 203 generates the target platform artefacts (TPA) using UCDC-TD, TCPS and RM. TPA includes artefacts like target platform specific scripts, target platform specific templates, target platform specific configurations, and so forth. In some embodiments, TPA includes at least one of a target provisioning template and a target provisioning script. It should be noted that specific templates represent a particular application landscape of resources like virtual machines, storage, load balancers, and so forth. Further, scripts are created/generated using the information in the template. The topology information provides the data pertaining to the types and quantity of resources to be provisioned. The scripts that are created or generated are meant to execute the workflow as defined using the resource specifications provided. For example, the workflow may involve installing virtual machine 1 and software 1 on cloud 1, installing virtual machine 2 and software 2 on cloud 2, and enabling communication between cloud 1 and cloud 2.

The template module 203 then updates the UCDC-TD with the information about the TPA captured within the AT constructs and stores the UCDC template and the TPA within a template repository (TR) with version control and search capabilities. Further, the template module 203 provides the ability to search and retrieve UCDC templates which were previously created based on the AS and DS information. As will be appreciated by those skilled in the art, the template module 203 interacts with the configuration module 202 and the user interface 201 during the process of creation, update and search activities on the template. The other modules such as the provisioning module 204, the deployment module 205, and the validation module 206 interface with the template module 203 during the search and execution of the templates.

The provisioning module 204 provides the capability to execute the workflow steps within the PF construct defined in UCDC-WD. The provisioning module 204 receives the request for provisioning from the user interface 201. It then retrieves the configuration data from the configuration module 202 and the UCDC template data from the template module 203. The provisioning module 204 creates an executable object UCDC object from the UCDC template and loads it into the UCDC-Container. It manages execution of the workflow using the UCDC-Container which interprets the information captured within the UCDC-WD and executes the workflow using an embedded workflow engine.

Further, the provisioning module 204 registers the TPA with the respective target cloud platform. In certain embodiments, the format of the template is validated during the registration including reference check on previously registered templates. Once this registration is completed, requests to provision the resources using the registered templates may be made. For example, once the artefacts are registered on the target platform, the provisioning module 204 executes the workflows defined in the UCDC-WD to provision the necessary resources on the target cloud platform. The provisioning module 204 programmatically invokes the APIs on the target cloud platforms through the cloud interface 207 to trigger the provisioning of the required resources including Virtual Machines, Storage, Network, OS, and so forth. It should be noted that the API is provided by the target cloud platform and artefacts invokes the relevant APIs provided by the target cloud platform. Further, it should be noted that the method of execution of a registered artefacts on a cloud provider's platform is governed by the platform. Additionally, the provisioning module 204 validates that the resources are provisioned as per the topology defined in the UCDC. Validation is performed to ensure that the type and quantity of resources provisioned match the specifications in the template. It should be noted that the validation scripts are also created or generated while creating or generating the provisioning scripts. The provisioning module 204 will store the data of the resources provisioned on the various target cloud platforms within the Deployment Database (DD). UCDC-Container updates the PFS construct in UCDC-EC of the UCDC object after each step of the execution. The provisioning module 204 stores the UCDC object within the DD.

The deployment module 205 provides the capability to deploy the application components on the relevant resources provisioned across the hybrid cloud platform using the DF construct in the UCDC-WD of UCDC object. It receives the request for deployment from the user interface 201 or the provisioning module 204. The deployment module 205 retrieves the UCDC object from the DD and executes the deployment workflow as defined in DF construct in the UCDC-WD through the UCDC-containers. Further, the deployment module 205 orchestrates the setup of the application environment including middleware, database, messaging broker, and so forth with the relevant configurations. The deployment orchestration provides the rules for the deployment workflow. The deployment module 205 triggers the deployment of application components on these containers as appropriate. It should be noted that each execution of the deployment results in provisioning of the resources of the appropriate types and quantities as specified in the template. Additionally, the deployment module 205 updates the DFS construct in UCDC-EC of the UCDC object after every step is executed and will store the UCDC object in the DD. The deployment module 205 also triggers the verification of the deployment through the validation module 206. Further, the deployment module 205 interacts with the various modules of the DPDS engine including the user interface 201, configuration module 202, the template module 203, the provisioning module 204, the validation module 206, and the cloud interface 207.

The validation module 206 provides the capability to verify and validate that the provisioning and deployment activities are completed as expected. It employs the UCDC object to retrieve the verification scripts from the template repository and executes the verification scripts on the target platforms using the cloud interface 207. The validation module 206 validates the results of the verification scripts executed on the different target platforms and determine if the deployment is completed successfully. If successful, the validation module will update the relevant meta-data of the job run into the deployment database for future re-use. If the deployment is not successful and if the validation module 206 is configured to roll back failed deployments, the validation module 206 may trigger a roll back workflow on the target cloud platforms. Further, the deployment module 205 interacts with the configuration module 202, the template module 203, and the cloud interface 207.

The cloud Interface 207 provides a generic interface to all the components to communicate with multiple target cloud platform. The cloud interface 207 comprises of cloud adapters (CA) which will communicate with the respective target cloud platforms to accomplish the tasks. When any module wants to communicate with a particular target cloud, the cloud interface 207 mediates the communication through the corresponding CA. The cloud Interface 207 interacts with provisioning module 204, the deployment module 205, and the validation modules.

It should be noted that the DPDS engine 200 may be implemented in programmable hardware devices such as programmable gate arrays, programmable array logic, programmable logic devices, and so forth. Alternatively, the DPDS engine 200 may be implemented in software for execution by various types of processors. An identified engine of executable code may, for instance, comprise one or more physical or logical blocks of computer instructions which may, for instance, be organized as an object, procedure, function, module, or other construct. Nevertheless, the executables of an identified engine need not be physically located together, but may comprise disparate instructions stored in different locations which, when joined logically together, comprise the engine and achieve the stated purpose of the engine. Indeed, an engine of executable code could be a single instruction, or many instructions, and may even be distributed over several different code segments, among different applications, and across several memory devices.

Figure 3:
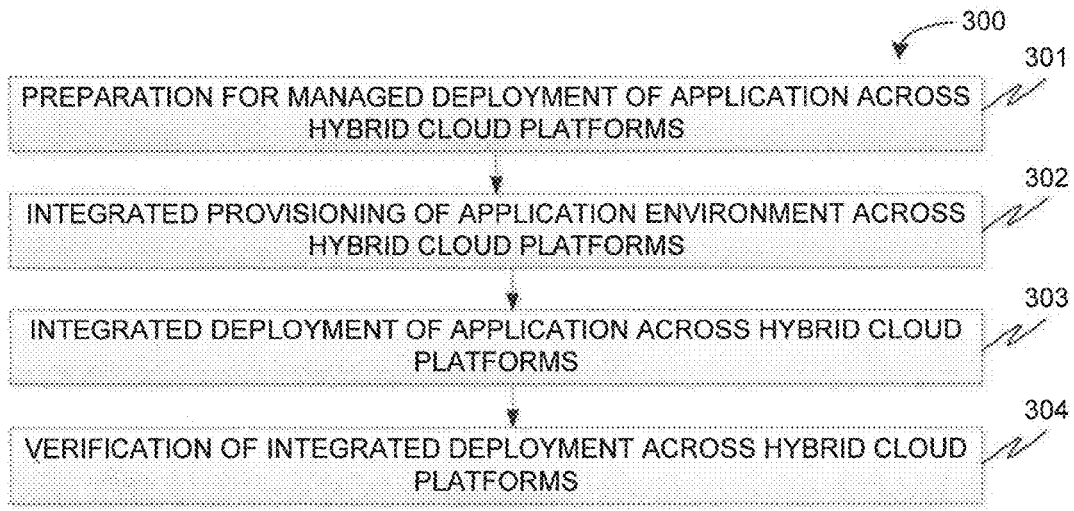
FIG. 3 is a flow diagram of an exemplary process overview for dynamic provisioning of application environment and deployment of application across hybrid cloud platform in accordance with some embodiments of the present disclosure.

Referring now to FIG. 3, an overview of an exemplary process 300 for dynamic provisioning of application environment and deployment of application across hybrid cloud platform is depicted via a flowchart in accordance with some embodiments of the present disclosure. The process 300 involves the steps of preparation for managed deployment of application across hybrid cloud platforms at step 301, provisioning of application environment across the hybrid cloud platforms at step 302, integrated deployment of application across the hybrid cloud platforms at step 303, and verification of the integrated deployment across the hybrid cloud platforms at step 304. Each of these steps will be described in greater detail herein below.

At step 301, the user interface acquires application specification (AS) and deployment specification (DS) from an authorized user i.e., admin user. The user interface then sends the acquired AS and DS to the configuration module. The configuration module initiates identification of an existing unified resource specification (URS) for the AS from the configuration database (CDB). In case URS does not exist for the AS, the configuration module directs the user interface to acquire the URS from the user using method of creation of generic resource template. Similarly, the configuration module initiates identification of target cloud platform specification (TCPS) from the CDB based on the DS. In case TCPS does not exist for the DS, the configuration module directs the user interface to obtain the TCPS from the user using method of creation of platform resource template. The configuration module then checks if the URS and/or the TCPS are newly created. In case it is true, the configuration module performs the method of generation of resource mapping (RM) to create RM for the URS, TCPS combination.

Further, the configuration module tries to retrieve an existing UCDC template with similar URS and TCPS from the template module. In case UCDC template does not exist, the configuration module requests the workflow specification (WS) input from the user interface. The user interface obtains the WS from the authorized user for the URS and TCPS and sends the WS to the configuration module. The configuration module triggers the template module to create an instance of UCDC template based on AS, DS, URS, TCPS, RM and WS. In response, the template module generates the UCDC-TD using URS and AS. The URS and AS information are captured in the NT and RT constructs. Additionally, the template module generates the UCDC-WD using the WS, DS, TCPS. The template module further generates the target platform artefacts (TPA) using the TCPS, URS and RM information and captures the artefact information in the AT construct of UCDC-TD. The template module then creates a UCDC template embedding the UCDC-TD and UCDC-WD in the UCDC-SC. Additionally, the template module creates the UCDC-EC based on the PF and OF defined in the UCDC-WD. Subsequently, the user interface displays the UCDC template to the authorized user for committing and sends the committed UCDC template to the configuration module for persisting. The configuration module then stores any of the newly created UCDC template meta-data, URS, TCPS and RM into the CDB and the UCDC template instance with the template repository (TR) via the template module.

At step 302, the provisioning module obtains the request to trigger the provisioning from the user through the user interface. The provisioning module then retrieves the configuration data from the configuration module and the UCDC template from the template module. For each target platform, the provisioning module registers the target platform artefacts (TPA). For registering TPA, the cloud interface creates a session with the target platform using the relevant credentials, the provisioning module then retrieves the relevant TPA from the template module, the provisioning module then registers or uploads the TPA with the target cloud platform through the cloud interface, the provisioning module finally validates that the TPA is uploaded correctly on the target cloud platform and has the appropriate access rights through the cloud interface.

Once artefacts are registered, the provisioning module creates an executable object UCDC object from the UCDC template and loads it into the UCDC-Container and starts the workflow execution using the UCDC-Container. The UCDC-Container interprets the ProvisioningFlow (PF) construct in the UCDC object and executes the workflow using the embedded workflow engine. If the workflow step had required invoking the application program interface (API) on the target cloud platform, UCDC-Container invokes the API on the specific target cloud platform through the cloud interface. The provisioning module then validates that the resources are provisioned as per the topology defined in the UCDC. It should be noted that after execution of every step in the workflow, UCDC-Container updates the ProvisioningFlowStatus (PFS) construct in UCDC-EC of the UCDC object. The provisioning module retrieves the information pertaining to the various resources provisioned on the target cloud platforms through the cloud interface and stores it within the deployment database (DD). The provisioning module stores the updated UCDC object within the DD.

At step 303, the deployment module receives the request to trigger the deployment of application from the user interface. The deployment module then retrieves the UCDC object from the DD and executes the deployment workflow as defined in DeploymentFlow (DF) construct in the UCDC-WD through the UCDC-Containers. The UCDC-Containers will trigger the deployment of the application component on the relevant target cloud platform via the API using the cloud interface. The deployment module then update the DeploymentFlowStatus (DFS) construct in UCDC-EC of the UCDC object after every step is executed. After the deployment is completed the deployment module stores the UCDC object in the DD. Additionally, the deployment module triggers the verification of the deployment using the validation module.

At step 304, the validation module receives the verification request from the deployment module. The validation module then retrieves the UCDC object from the DD and the relevant verification scripts stored in TR from the template module. The validation module triggers the verification scripts on the corresponding target platforms using the cloud interface and validates the results of the verification scripts to determine if deployment is completed successfully. In case the deployment is not successful and if the UCDC object has the configuration to roll back on failure, the validation module triggers a roll back workflow through the cloud interface. Additionally, the validation module updates the DD with the meta-data associated with the deployment execution for future use.

As will be appreciated by one skilled in the art, a variety of processes may be employed for provisioning of application environment and deployment of application across hybrid cloud platform. For example, the exemplary system 100 and the associated DPDS engine 200 may provision necessary application environment and then perform managed deployment the application on the provided environment across the hybrid cloud platforms by the processes discussed herein. In particular, as will be appreciated by those of ordinary skill in the art, control logic and/or automated routines for performing the techniques and steps described herein may be implemented by the system 100 and the associated DPDS engine 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
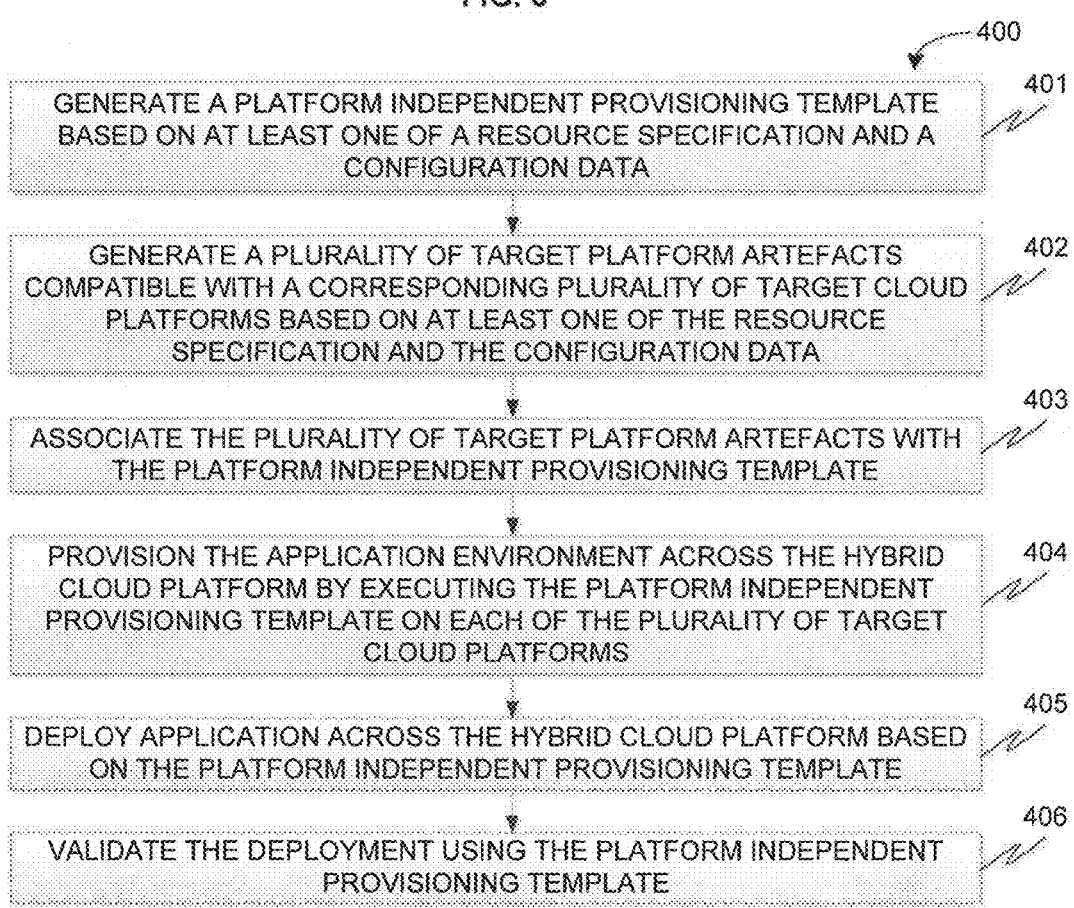
FIG. 4 is a flow diagram of an exemplary process for dynamic provisioning of application environment and deployment of application across hybrid cloud platform in accordance with some embodiments of the present disclosure.

For example, referring now to FIG. 4, exemplary control logic 400 for provisioning an application environment and deploying an application across a hybrid cloud platform via a system, such as system 100, is depicted via a flowchart in accordance with some embodiments of the present disclosure. As illustrated in the flowchart, the control logic 400 includes the step of generating a platform independent provisioning template based on at least one of a resource specification and a configuration data at step 401. The platform independent provisioning template is compatible with multiple cloud platforms. The control logic 400 further includes the steps of generating a plurality of target platform artefacts compatible with a corresponding plurality of target cloud platforms based on at least one of the resource specification and the configuration data at step 402, associating the plurality of target platform artefacts with the platform independent provisioning template at step 403, and provisioning the application environment across the hybrid cloud platform by executing the platform independent provisioning template on each of the plurality of target cloud platforms at step 404. The control logic 400 may further include the step of deploying the application across the hybrid cloud platform based on the platform independent provisioning template at step 405, and validating the deployment using the platform independent provisioning template at step 406.

Figure 5A:
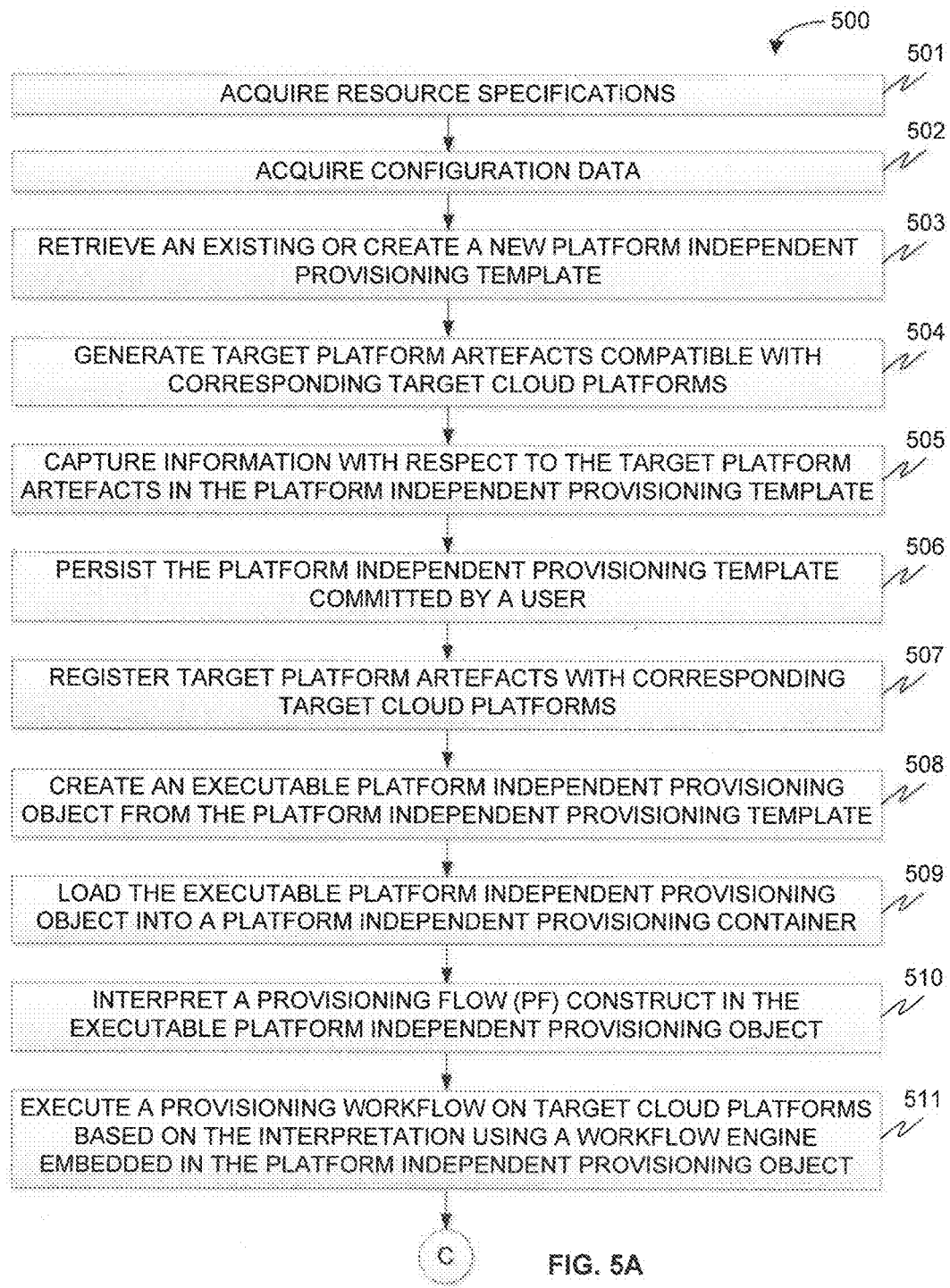
FIGS. 5A and 5B is a flow diagram of a detailed exemplary process for dynamic provisioning of application environment and deployment of application across hybrid cloud platform in accordance with some embodiments of the present disclosure.
Figure 5B:
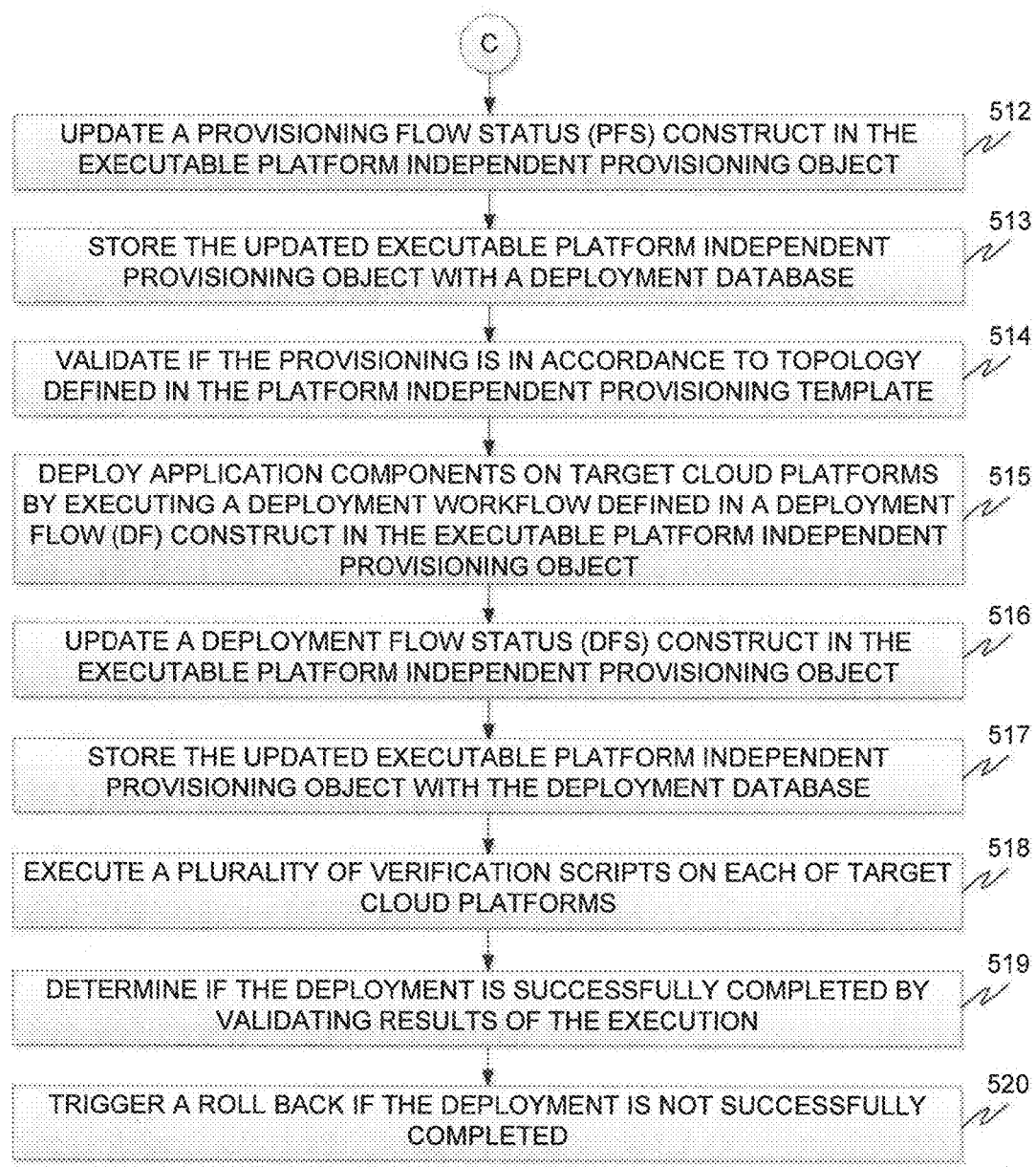

The control logic 400 is depicted in greater detail in FIGS. 5A and 5B. Referring now to FIGS. 5A and 5B, exemplary control logic 500 for provisioning the application environment and deploying the application across a hybrid cloud platform is depicted via a flowchart in accordance with some embodiments of the present disclosure. As illustrated in the flowchart, the control logic 500 includes the steps of acquiring resource specifications at step 501, and acquiring the configuration data at step 502. As noted above, in some embodiments, the resource specifications may be acquired from a user. Similarly, the configuration data may be acquired from a configuration database based on the resource specifications or may be acquired directly from the user. The control logic 500 further includes the step of retrieving an existing or creating a new platform independent provisioning template at step 503. An existing platform independent provisioning template may be retrieved based on at least one of the resource specification and the configuration data from a template repository. Alternatively, a new platform independent provisioning template may be created based on at least one of the resource specification and the configuration data. The new platform independent provisioning template is then stored in the template repository. The control logic 500 further includes the steps of generating a plurality of target platform artefacts compatible with a corresponding plurality of target cloud platforms based on at least one of the resource specification and the configuration data at step 504, and capturing information with respect to the plurality of target platform artefacts in the platform independent provisioning template at step 505. The control logic 500 further includes the step of persisting the platform independent provisioning template committed by the user at step 506. The retrieved or created platform independent provisioning template may be displayed to the user for committing.

Additionally, the control logic 500 includes the step of registering each of the plurality of target platform artefacts with the corresponding plurality of target cloud platforms at step 507. Further, the control logic 500 includes the steps of creating an executable platform independent provisioning object from the platform independent provisioning template at step 508, loading the executable platform independent provisioning object into a platform independent provisioning container at step 509, interpreting a provisioning flow (PF) construct in the executable platform independent provisioning object via the platform independent provisioning container at step 510, and executing a provisioning workflow on the plurality of target cloud platforms based on the interpretation using a workflow engine embedded in the platform independent provisioning object at step 511. The control logic 500 further includes the steps of updating a provisioning flow status (PFS) construct in the executable platform independent provisioning object after execution of each step in the workflow at step 512, storing the updated executable platform independent provisioning object with a deployment database at step 513, and validating if the provisioning is in accordance to topology defined in the platform independent provisioning template at step 514.

Moreover, the control logic 500 includes the steps of deploying application components on the plurality of target cloud platforms by executing a deployment workflow defined in a deployment flow (DF) construct in an executable platform independent provisioning object via a platform independent provisioning container at step 515, updating a deployment flow status (DFS) construct in the executable platform independent provisioning object after execution of each step in the workflow at step 516, and storing the updated executable platform independent provisioning object with the deployment database at step 517. The control logic 500 further includes the steps of executing a plurality of verification scripts on each of the plurality of target cloud platforms at step 518, determining if the deployment is successfully completed by validating results of the execution at step 519, and triggering a roll back if the deployment is not successfully completed at step 520.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
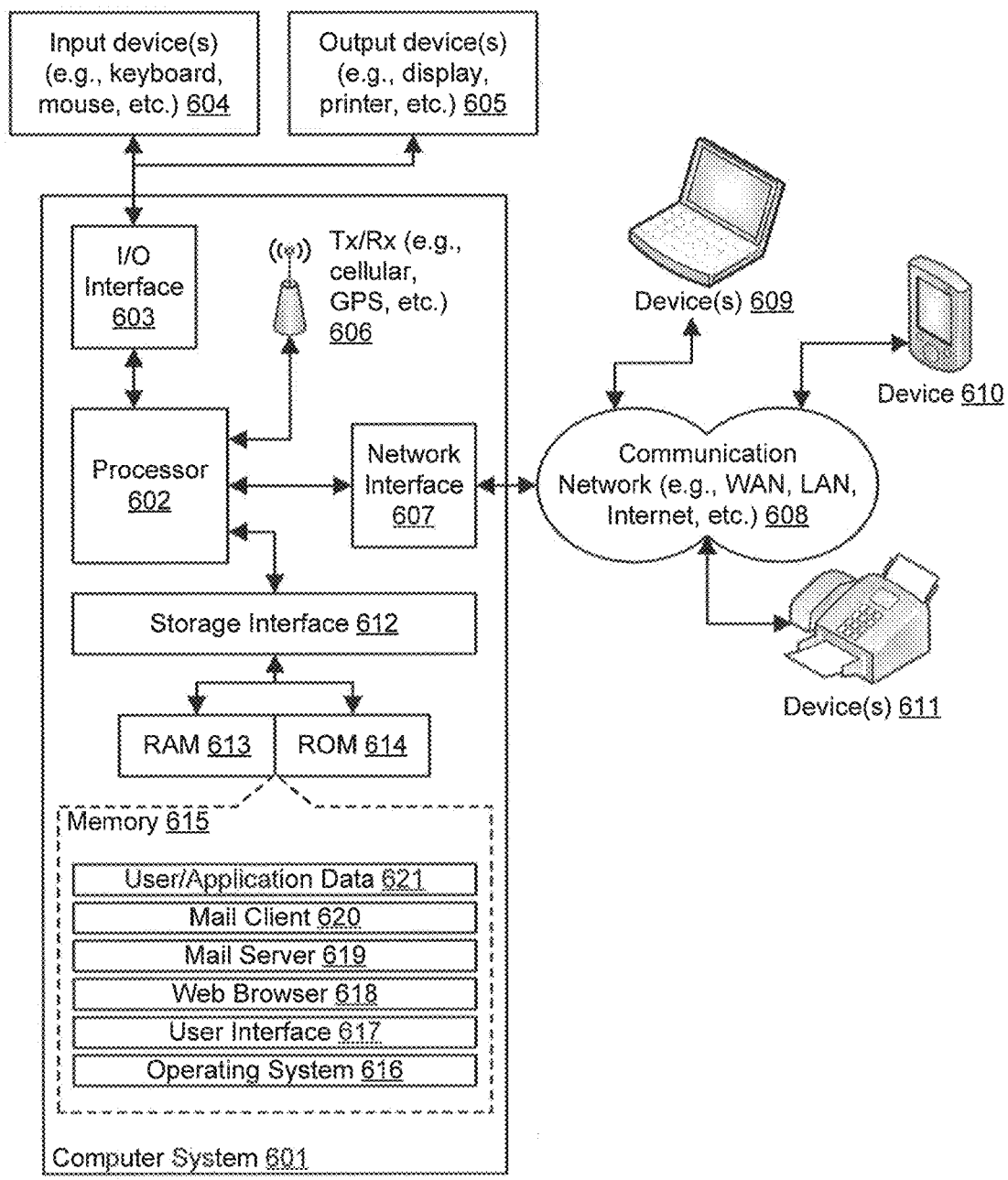
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 and DPDS engine 200 for provision of application environment and deployment of application across the hybrid cloud platform. Computer system 601 may comprise a central processing unit ("CPU" or "processor") 602. Processor 602 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 413, ROM 414, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., resource specifications, configuration data, UCDC templates, target platform artefacts, verification scripts, UCDC objects, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for integrated provisioning of necessary application environment and managed deployment of application on the application environment across hybrid cloud platforms. The techniques provide integrated provisioning of the necessary application environment using the integrated and reusable artefacts based on unified cloud deployment context (UCDC). Additionally, the techniques for provisioning application environment across hybrid cloud platforms as described in the embodiments discussed above employ generic platform independent template provided by UCDC and managed workflow based on UCDC. Similarly, the techniques for managed deployment of an application across hybrid cloud platforms and verification of the deployment as described in the embodiments discussed above employ generic platform independent template based on UCDC.

Further, when the user executes a registered template on a cloud provider's platform, the method of execution is governed by the platform. The user does not have control over the execution and the outcome of the execution is notified by the platform. Since the content of notification is quite diverse for different providers, interpretation and analysis of root cause of any deployment related issues and determination of corresponding fixes for those issues can be quite challenging. As be appreciated by those skilled in the art, the techniques described in the various embodiments discussed above provides a standard notification and therefore enables convenient interpretation and analysis of root cause of any deployment related issues.

The specification has described system and method for provisioning of application environment and deployment of application across hybrid cloud platform. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for provisioning an application environment across a hybrid cloud platform, the method comprising:
    generating, via a processor, a platform independent provisioning template based on at least one of a resource specification and a configuration data, the platform independent provisioning template being compatible with multiple cloud platforms, wherein the platform independent provisioning template comprises a unified cloud deployment context (UCDC) template in XML format based on topology and orchestration specification for cloud application (TOSCA) standard;
    generating, via the processor, a plurality of target platform artefacts compatible with a corresponding plurality of target cloud platforms based on at least one of the resource specification and the configuration data;
    associating, via the processor, the plurality of target platform artefacts with the platform independent provisioning template; and
    provisioning, via the processor, the application environment across the hybrid cloud platform by executing the platform independent provisioning template on each of the plurality of target cloud platforms.

2. The method of claim 1, further comprising acquiring the resource specification from a user.

3. The method of claim 1, wherein the resource specification comprises at least one of an application specification (AS), a deployment specification (DS), a workflow specification (WS), a computing capacity, a storage capacity, a network requirement, an application executable, an application container, a middleware information, and a database information.

4. The method of claim 1, further comprising acquiring the configuration data from a configuration database based on the resource specification or acquiring the configuration data from a user.

5. The method of claim 1, wherein the configuration data comprises at least one of unified resource specifications (URS), target cloud platform specifications (TCPS), and a resource mapping (RM), and wherein the RM is a mapping between the URS and the TCPS.

6. The method of claim 1, wherein generating the platform independent provisioning template comprises:
    retrieving an existing platform independent provisioning template based on at least one of the resource specification and the configuration data from a template repository; or
    creating a new platform independent provisioning template based on at least one of the resource specification and the configuration data, and storing the new platform independent provisioning template in the template repository.

7. The method of claim 1, wherein the UCDC template comprises UCDC-Service Context (UCDC-SC) section and UCDC-Execution Context (UCDC-EC) section, and wherein UCDC-SC comprises UCDC-Topology Definition (UCDC-TD) and UCDC Workflow Definition (UCDC-WD) for the application environment.

8. The method of claim 1, wherein each of the plurality of target platform artefacts comprises at least one of a target provisioning template and a target provisioning script.

9. The method of claim 1, wherein associating the plurality of target platform artefacts comprises capturing information with respect to the plurality of target platform artefacts in the platform independent provisioning template.

10. The method of claim 1, further comprising:
    displaying the platform independent provisioning template to a user for committing; and
    persisting the platform independent provisioning template committed by the user.

11. The method of claim 1, wherein executing the platform independent provisioning template comprises registering each of the plurality of target platform artefacts with the corresponding plurality of target cloud platforms.

12. The method of claim 1, wherein executing the platform independent provisioning template comprises:
    creating an executable platform independent provisioning object from the platform independent provisioning template;
    loading the executable platform independent provisioning object into a platform independent provisioning container;
    interpreting a provisioning flow (PF) construct in the executable platform independent provisioning object via the platform independent provisioning container; and
    executing a provisioning workflow on the plurality of target cloud platforms based on the interpretation using a workflow engine embedded in the platform independent provisioning object.

13. The method of claim 12, further comprising:
    updating a provisioning flow status (PFS) construct in the executable platform independent provisioning object after execution of each step in the workflow; and
    storing the updated executable platform independent provisioning object with a deployment database.

14. The method of claim 1, further comprising validating if the provisioning is in accordance to topology defined in the platform independent provisioning template.

15. The method of claim 1, further comprising deploying an application on the application environment across the hybrid cloud platform based on the platform independent provisioning template.

16. The method of claim 15, wherein deploying the application comprises deploying application components on the plurality of target cloud platforms by:
executing a deployment workflow defined in a deployment flow (DF) construct in an executable platform independent provisioning object via a platform independent provisioning container;
updating a deployment flow status (DFS) construct in the executable platform independent provisioning object after execution of each step in the workflow; and
storing the updated executable platform independent provisioning object with a deployment database.

17. The method of claim 15, further comprising validating the deployment using the platform independent provisioning template.

18. The method of claim 17, wherein validating, for each of the plurality of target cloud platforms, comprises:
executing a plurality of verification scripts on a target cloud platform,
determining if the deployment is successfully completed by validating results of the execution; and
triggering a roll back if the deployment is not successfully completed.

19. A system for provisioning an application environment across a hybrid cloud platform, the system comprising:
at least one processor; and
a computer-readable medium storing instructions that, when executed by the at least one processor, cause the at least one processor to perform operations comprising:
generating a platform independent provisioning template based on at least one of a resource specification and a configuration data, the platform independent provisioning template being compatible with multiple cloud platforms, wherein the platform independent provisioning template comprises a unified cloud deployment context (UCDC) template in XML format based on topology and orchestration specification for cloud application (TOSCA) standard;
generating a plurality of target platform artefacts compatible with a corresponding plurality of target cloud platforms based on at least one of the resource specification and the configuration data;
associating the plurality of target platform artefacts with the platform independent provisioning template; and
provisioning the application environment across the hybrid cloud platform by executing the platform independent provisioning template on each of the plurality of target cloud platforms.

20. The system of claim 19, wherein generating the platform independent provisioning template comprises:
retrieving an existing platform independent provisioning template based on at least one of the resource specification and the configuration data from a template repository; or
creating a new platform independent provisioning template based on at least one of the resource specification and the configuration data, and storing the new platform independent provisioning template in the template repository.

21. The system of claim 19, wherein executing the platform independent provisioning template comprises:
creating an executable platform independent provisioning object from the platform independent provisioning template;
loading the executable platform independent provisioning object into a platform independent provisioning container;
interpreting a provisioning flow (PF) construct in the executable platform independent provisioning object via the platform independent provisioning container; and
executing a provisioning workflow on the plurality of target cloud platforms based on the interpretation using a workflow engine embedded in the platform independent provisioning object.

22. The system of claim 21, wherein the operations further comprise:
updating a provisioning flow status (PFS) construct in the executable platform independent provisioning object after execution of each step in the workflow; and
storing the updated executable platform independent provisioning object with a deployment database.

23. The system of claim 19, wherein the operations further comprise deploying an application across the hybrid cloud platform based on the platform independent provisioning template, and wherein deploying the application comprises deploying application components on the plurality of target cloud platforms by:
executing a deployment workflow defined in a deployment flow (DF) construct in an executable platform independent provisioning object via a platform independent provisioning container;
updating a deployment flow status (DFS) construct in the executable platform independent provisioning object after execution of each step in the workflow; and
storing the updated executable platform independent provisioning object with a deployment database.

24. The system of claim 23, wherein the operations further comprise validating the deployment using the platform independent provisioning template by:
executing a plurality of verification scripts on each of the plurality of target cloud platforms;
determining if the deployment is successfully completed by validating results of the execution; and
triggering a roll back if the deployment is not successfully completed.

25. A non-transitory computer-readable medium storing computer-executable instructions for:
generating a platform independent provisioning template based on at least one of a resource specification and a configuration data, the platform independent provisioning template being compatible with multiple cloud platforms, wherein the platform independent provisioning template comprises a unified cloud deployment context (UCDC) template in XML format based on topology and orchestration specification for cloud application (TOSCA) standard;
generating a plurality of target platform artefacts compatible with a corresponding plurality of target cloud platforms based on at least one of the resource specification and the configuration data;
associating the plurality of target platform artefacts with the platform independent provisioning template: and
provisioning the application environment across the hybrid cloud platform by executing the platform independent provisioning template on each of the plurality of target cloud platforms.

* * * * *